United States Patent
Miyairi et al.

(10) Patent No.: US 11,369,952 B2
(45) Date of Patent: Jun. 28, 2022

(54) HONEYCOMB STRUCTURE AND EXHAUST GAS PURIFYING DEVICE

(71) Applicant: NGK INSULATORS, LTD., Nagoya (JP)

(72) Inventors: Yukio Miyairi, Nagoya (JP); Masaaki Masuda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/302,991

(22) Filed: May 18, 2021

(65) Prior Publication Data

US 2021/0291157 A1     Sep. 23, 2021

Related U.S. Application Data

(63) Continuation of application No. PCT/JP2019/034020, filed on Aug. 29, 2019.

(30) Foreign Application Priority Data

Nov. 30, 2018  (JP) .............................. JP2018-225822

(51) Int. Cl.
  *B01J 35/00*  (2006.01)
  *B01J 35/04*  (2006.01)
  (Continued)

(52) U.S. Cl.
  CPC .......... *B01J 35/04* (2013.01); *B01D 39/2075* (2013.01); *B01D 46/244* (2013.01);
  (Continued)

(58) Field of Classification Search
  CPC ... B01J 35/04; B01J 35/0033; B01D 39/2075; B01D 46/244; B01D 46/2459;
  (Continued)

(56) References Cited

U.S. PATENT DOCUMENTS 4,364,761 A    12/1982  Berg et al.
2003/0165638 A1  9/2003  Louks et al.
(Continued)

FOREIGN PATENT DOCUMENTS

EP    2 918 565 A1    9/2015
JP    S56-124417 A1    9/1981
(Continued)

OTHER PUBLICATIONS

International Search Report and Written Opinion (Application No. PCT/JP2019/034020) dated Nov. 26, 2019.
(Continued)

*Primary Examiner* — Tom P Duong
(74) *Attorney, Agent, or Firm* — Burr & Brown, PLLC

(57) ABSTRACT

A pillar shaped honeycomb structure includes: a porous partition wall that defines a plurality of cells, the cells forming flow paths for a fluid, the cells extending from an inflow end face to an outflow end face; and an outer peripheral wall located at the outermost circumference. The cells include: a plurality of cells A wherein a side of the inflow end face is opened and the outflow end face has a plugged portion; and a plurality of cells B wherein a side of the outflow end face is opened and the inflow end face has a plugged portion, the cells B being arranged alternately with the cells A. One or both of the plugged portion of the cells A and the plugged portions of the cells B contain a magnetic substance and glass.

13 Claims, 6 Drawing Sheets

(51) Int. Cl.
  *B01D 39/20* (2006.01)
  *B01D 46/24* (2006.01)
  *B01D 53/94* (2006.01)
  *B01D 53/96* (2006.01)
  *F01N 3/10* (2006.01)
  *F01N 3/20* (2006.01)
  *F01N 3/28* (2006.01)
  *B01D 46/84* (2022.01)

(52) U.S. Cl.
  CPC ..... *B01D 46/2459* (2013.01); *B01D 46/2474* (2013.01); *B01D 46/84* (2022.01); *B01D 53/94* (2013.01); *B01D 53/96* (2013.01); *B01J 35/0033* (2013.01); *F01N 3/101* (2013.01); *F01N 3/2066* (2013.01); *F01N 3/2825* (2013.01); *B01D 46/249* (2021.08); *B01D 2255/9155* (2013.01); *B01D 2279/30* (2013.01); *F01N 2330/06* (2013.01)

(58) Field of Classification Search
  CPC .... B01D 46/2474; B01D 46/84; B01D 53/94; B01D 53/96; F01N 3/101; F01N 3/2066; F01N 3/2825
  See application file for complete search history.

(56) References Cited

U.S. PATENT DOCUMENTS

| | | | | |
|---|---|---|---|---|
| 2007/0252310 | A1* | 11/2007 | Brockway | C04B 38/0012 264/630 |
| 2010/0180562 | A1 | 7/2010 | Kong et al. | |
| 2011/0203242 | A1 | 8/2011 | Goto et al. | |
| 2017/0014763 | A1* | 1/2017 | Crawford | B01D 53/94 |
| 2017/0014764 | A1* | 1/2017 | Crawford | F01N 3/2013 |
| 2017/0014765 | A1* | 1/2017 | Crawford | B01D 53/9418 |
| 2017/0022868 | A1 | 1/2017 | Crawford et al. | |
| 2019/0070596 | A1* | 3/2019 | Yang | B01J 35/04 |
| 2019/0160429 | A1* | 5/2019 | Crawford | F01N 3/2803 |

FOREIGN PATENT DOCUMENTS

| | | |
|---|---|---|
| JP | H11-336534 A1 | 12/1999 |
| JP | 2005-516877 A1 | 6/2005 |
| JP | 2008-136918 A | 6/2008 |
| JP | 4920752 B2 | 4/2012 |
| JP | 5261256 B2 | 8/2013 |
| JP | 2018-030072 A1 | 3/2018 |
| WO | 2016/021186 A1 | 2/2016 |

OTHER PUBLICATIONS

English translation of the International Preliminary Report on Patentability (Chapter I) dated Jun. 10, 2021 (Application No. PCT/JP2019/034020).

Japanese Office Action (Application No. 2020-558103) dated Apr. 5, 2022 (with English translation).

German Office Action (Application No. 11 2019 005 966.1) dated Apr. 19, 2022.

* cited by examiner

HONEYCOMB STRUCTURE AND EXHAUST GAS PURIFYING DEVICE

FIELD OF THE INVENTION

The present invention relates to a honeycomb structure and an exhaust gas purifying device. More particularly, it relates to a honeycomb structure and an exhaust gas purifying device, which can burn out and remove carbon fine particles by electric heating, and which can suppress an increase in pressure loss.

BACKGROUND OF THE INVENTION

Exhaust gases from motor vehicles typically contain fine particles of carbon or the like as a result of incomplete combustion. From the viewpoint of reducing health hazards to a human body, there is an increasing need for reducing fine particles in exhaust gases from motor vehicles. At the present time, the reduction of fine particles in the emission extremely close to zero is also required for fine particles emitted from gasoline engines which are the mainstream of power sources for motor vehicles. There is also the same need for fine particles in exhaust gases from diesel engines.

As a countermeasure, Patent Literature 1 proposes a honeycomb structure including: a honeycomb structure portion having porous partition walls that define a plurality of cells serving as fluid flow paths, and an outer peripheral wall positioned at the outermost circumference; and plugged portions arranged at opening portions of the cells at an end face on an inlet side of the fluid and at remaining opening portions of the cells at an end face on an outlet side of the fluid in the honeycomb structure portion.

When mounting the above filter on a vehicle, it is preferable to mount the filter at an underfloor position having a relatively large space from the viewpoint of ensuring a mounting space, in terms of ensuring a degree of freedom in a design for forming an exhaust system. However, if the above filter is placed at the underfloor position, a temperature of an exhaust gas of an engine is decreased, the combustion of fine particles (carbon fine particles) accumulated in the filter does not proceed, and the carbon fine particles are accumulated, which have a problem of causing an excessive increase in pressure loss to decrease an engine output. In order to avoid this, as disclosed in Patent Literature 2, a method has been proposed in which an electric current is passed through a conductive honeycomb structure itself and the honeycomb structure itself is heated by the Joule heat. However, the technique as disclosed in Patent Literature 2 has a problem that an electric short circuit occurs if condensed water is generated in an exhaust gas in an exhaust gas pipe.

In order to address this problem, as a heating technique that can be used in an environment where condensed water is generated and can be used even under conditions where carbon fine particles are deposited, Patent Literature 3 discloses a method of induction heating by means of a coil configured to insert a metal wire into non-conductive honeycomb cells to go around an outer peripheral surface of a honeycomb structure, without passing electric current through the honeycomb structure itself.

CITATION LIST

Patent Literatures
[Patent Literature 1] Japanese Patent No. 4920752 B
[Patent Literature 2] Japanese Patent No. 5261256 B
[Patent Literature 3] U.S. Patent Application Publication No. 2017/0022868 A1

SUMMARY OF THE INVENTION

As a result of studies, the present inventors have found that when the technique disclosed in Patent Literature 3 is applied to a honeycomb structure filter, some cells cannot be used as gas flow paths, and a filtration area of the filter is decreased, which may cause a significant increase in pressure loss.

An object of the present invention is to provide a honeycomb structure and an exhaust gas purifying device, which can burn out and remove carbon fine particles by electric heating, and which can suppress an increase in pressure loss.

As a result of intensive studies, the present inventors have found that the above problems can be solved by configuring a honeycomb structure such that cells serving as flow paths for a fluid include: a plurality of cells A which are opened on an inflow side of the fluid and have a plugged portion on an end face on an outflow side of the fluid; and a plurality of cells B which are arranged alternately with the cells A, and which are opened on the outflow side of the fluid and have a plugged portion on the inflow side of the fluid, and further such that one or both of the plugged portions of the cells A and the plugged portions of the cells B include a magnetic substance.

Thus, the present invention is specified as follows.

(1)
A pillar shaped honeycomb structure, comprising:
a porous partition wall that defines a plurality of cells, the cells forming flow paths for a fluid, the cells extending from an inflow end face that is an end face on an inflow side of the fluid to an outflow end face that is an end face on an outflow side of the fluid; and
an outer peripheral wall located at the outermost circumference;
wherein the cells comprise: a plurality of cells A wherein a side of the inflow end face is opened and the outflow end face has a plugged portion; and a plurality of cells B wherein a side of the outflow end face is opened and the inflow end face has a plugged portion, the cells B being arranged alternately with the cells A; and
wherein one or both of the plugged portion of the cells A and the plugged portions of the cells B comprise a magnetic substance.

(2)
An exhaust gas purifying device, comprising:
the honeycomb structure according to (1); and
a coil wiring that spirally surrounds an outer circumference of the honeycomb structure.

According to the present invention, it is possible to provide a honeycomb structure and an exhaust gas purifying device, which can burn out and remove carbon fine particles by electric heating, and which can suppress an increase in pressure loss.

DETAILED DESCRIPTION OF THE INVENTION

Figure 1:
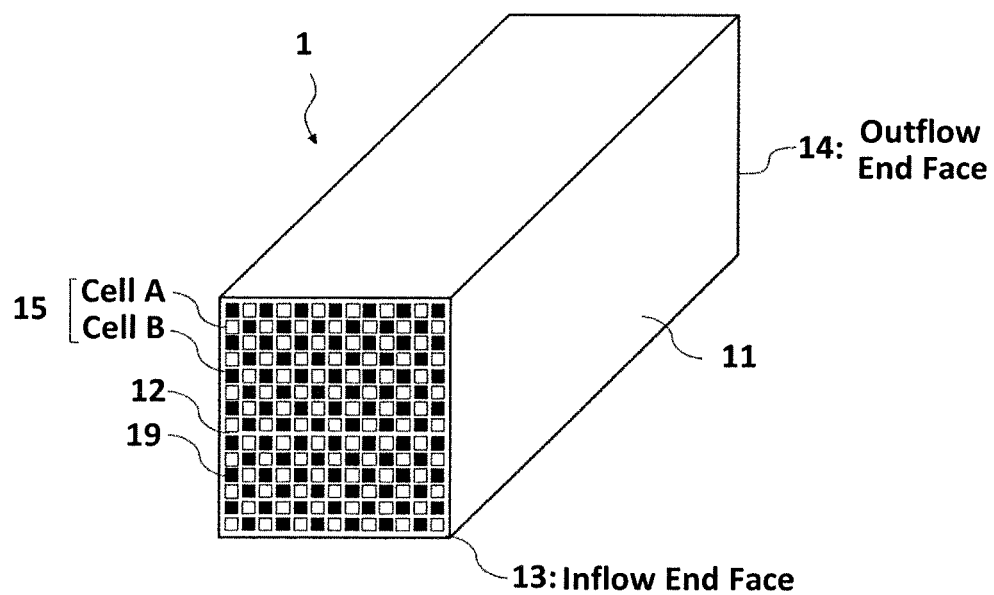
FIG. 1 is a perspective view schematically illustrating a honeycomb structure according to an embodiment of the present invention.

Hereinafter, embodiments of a honeycomb structure according to the present invention will be described with reference to the drawing. However, the present invention is not limited to these embodiments, and various changes, modifications, and improvements may be made based on knowledge of those skilled in the art, without departing from the scope of the present invention.

(1. Honeycomb Structure)

Figure 2:
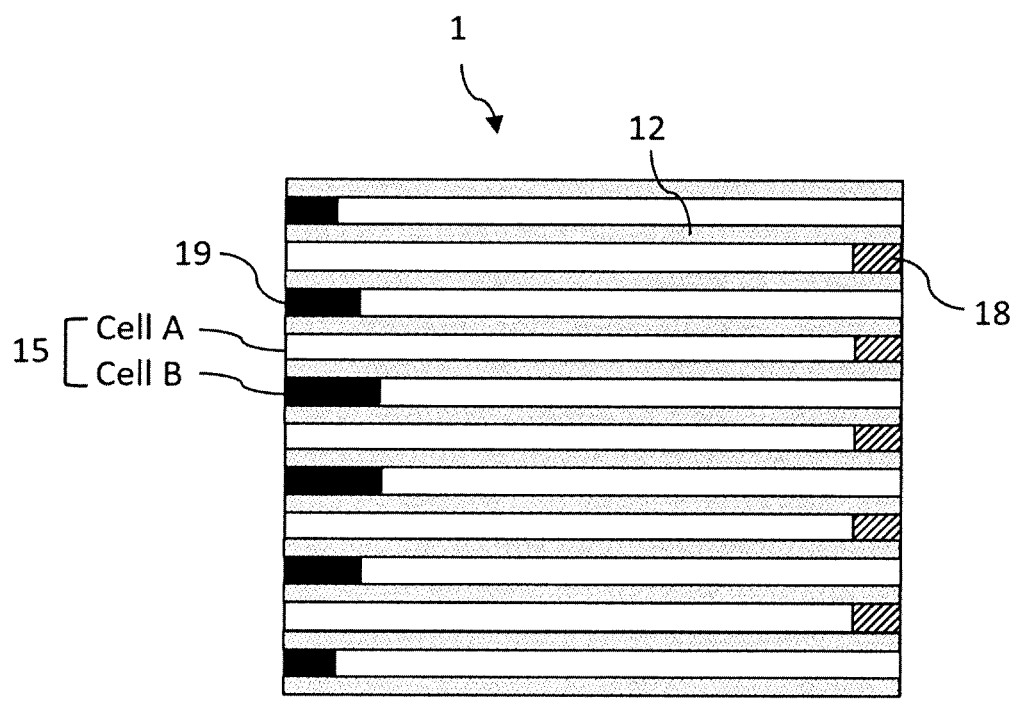
FIG. 2 is a cross-sectional view schematically illustrating a cross section of a honeycomb structure shown in FIG. 1 for cells having plugged portions and partition walls, which cross section is parallel to a cell extending direction (a gas flow direction)

FIG. 1 shows a perspective view schematically illustrating a honeycomb structure 1 according to an embodiment of the present invention. FIG. 2 shows a cross-sectional view schematically illustrating a cross section of the honeycomb structure 1 shown in FIG. 1 for cells 15 having plugged portions 18, 19 and partition walls 12, which cross section is parallel to a cell extending direction (a gas flow direction). The illustrated honeycomb structure 1 includes: porous partition walls 12 that define a plurality of cells 15 extending from an inflow end face 13, which is an end face on an inflow side of a fluid, to an outflow end face 14, which is an end face on an outflow side of the fluid, to form flow paths for a fluid; and an outer peripheral wall 11 located on the outermost circumference. In the illustrated honeycomb structure 1, the cells 15 include: a plurality of cells A which are opened on the inflow side of the fluid and have plugged portions 18 on the outflow side of the fluid; and a plurality of cells B which are arranged alternately with the cells A, and which are opened on the outflow side of the fluid and have plugged portions 19 on the inflow side of the fluid. The cells A and the cells B are alternately arranged so as to be adjacent to each other via the partition walls 12, and both end faces form a checkered pattern. The numbers, arrangements, shapes and the like of the cells A and B, as well as the thickness of the partition walls 12, and the like, are not limited, and may be appropriately designed as needed. The honeycomb structure 1 can be used as a filter (honeycomb filter) for purifying an exhaust gas.

In the illustrated honeycomb structure 1, the plugged portions 18 of the cells A which are opened on the inflow side of the fluid and have the plugged portions 18 on the end face on the outflow side of the fluid may employ those formed in the same manner as in the plugged portions of the conventionally known honeycomb structure. On the other hand, the plugged portions 19 of the cells B which are opened on the outflow side of the fluid and have the plugged portions 19 on the end surface on the inflow side of the fluid contain a magnetic substance. The plugged portions 19 of the cells B may contain a matrix that is a material used as the plugged portions of the conventionally known honeycomb structure, the matrix containing a magnetic substance, or may be composed of only a magnetic substance. In the illustrated honeycomb structure 1, only the plugged portions 19 of the cells B contain the magnetic substance, although not limited thereto. One or both of the plugged portions 18 of the cells A and the plugged portions 19 of the cells B may contain the magnetic substance. The plugged portions 18 of the cells A and the plugged portions 19 of the cells B may further contain glass. The plugged portions 18 and 19 of the cells A and B may be arranged after forming an outer peripheral coating, or may be arranged before forming the outer peripheral coating, i.e., at the stage of production of the honeycomb structure 1.

By structuring the honeycomb structure 1 such that one or both of the plugged portions 18 of the cells A and the plugged portions 19 of the cells B contain the magnetic material, plugged portions will continuingly contain the magnetic material when the honeycomb structure 1 is used as a honeycomb filter, which eliminates necessity to use the cells 15 of the honeycomb structure 1 only for filling the material containing the magnetic substance, resulting in suppression of an increase in pressure loss. Further, in the illustrated honeycomb structure 1, the cells B have the plugged portions 19 containing the magnetic substance on the end face on the inflow side of the fluid. Therefore, in an exhaust gas purifying device using the honeycomb structure 1, arranging of a coil wiring that spirally surrounds the outer circumference of the honeycomb structure 1 near positions corresponding to the plugged portions 19 of the cells B, i.e., only arranging of the coil wiring near the end face of the inflow side of the fluid so as to spirally surround the outer circumference of the honeycomb structure to cause induction heating can allow heat from the end face heated on the inflow side to be propagated in the partition walls 12 and the cells 15 as the fluid moves, and can cause the honeycomb structure to be heated to the outflow side. Therefore, this eliminates necessity to heat the entire honeycomb structure 1 in the length direction, so that the energy efficiency can be improved. Further, since only local heating is required without heating the entire honeycomb structure 1 in the length direction, an input power until combustion of PMs (particulate matters) can be reduced. Further, the PMs (particulate matters), which tend to be unevenly distributed near the end face in the cell 15, can be rapidly burned out and removed to easily regenerate the honeycomb structure filter. In the illustrated honeycomb structure 1, the coil wiring that spirally surrounds the outer circumference of the honeycomb structure 1 is arranged at the positions corresponding to the plugged portions 19 of the cells B as described above, although not limited thereto. The coil wiring may be provided at a position(s) corresponding to one or both of the plugged portion 18 of the cells A and the plugged portions 19 of the cells B. In this case, the plugged portions where the coil wiring is arranged at the corresponding positions in the axial direction of the honeycomb structure contain the magnetic substance.

Further, in the illustrated honeycomb structure 1, depths of the plugged portions 19 of the cells B containing the magnetic substance in the cell extending direction gradually decreases from the center toward the outermost circumference of the honeycomb structure 1. According to such a configuration, when the coil wiring is arranged at the positions corresponding to the plugged portions 19 of the cells B, that is, when the coil wiring is arranged so as to spirally surround the outer circumference of the honeycomb structure 1 near the end face on the inflow side of the fluid to cause induction heating, the depths of the plugged portions 19 on the outer circumferential side of the honeycomb structure 1 are the shortest, and the plugged portions 19 gradually become deeper toward the center, so that the heat generated by the induction heating is not easily blocked by the plugged portions 19 on the outer side, and the honeycomb structure 1 is satisfactorily heated to the center. The form of gradually decreasing from the center toward the outermost circumference of the honeycomb structure 1 is not particularly limited, and it can be appropriately designed. For example, the depths preferably decrease at an equal proportion from the center to the outermost circumference of the honeycomb structure 1. In the illustrated honeycomb structure 1, the depths of the plugged portions 19 of the cells B containing the magnetic substance in the cell extending direction gradually decrease from the center toward the outermost circumference of the honeycomb structure 1 as described above, although not limited thereto. The depths of one or both of the plugged portions 18 of the cells A and the plugged portions 19 of the cells B which contain the magnetic substance in the cell extending direction may gradually decrease from the center toward the outermost circumference of the honeycomb structure 1. Further, the honeycomb structure 1 may be formed such that the depths of one or both of the plugged portions 18 of the cells A and the plugged portions 19 of the cells B which contain the magnetic substance in the cell extending direction are changed from the center toward the outermost circumference of the honeycomb structure 1 in order to match to a desired purpose as needed.

The magnetic substance preferably has a Curie point of 700° C. or more, although not particularly limited thereto. Further, the Curie point of the magnetic substance may be 800° C. or more. The Curie point of the magnetic substance of 700° C. or more can enable a honeycomb temperature sufficient to increase the catalyst temperature to the catalytic activity temperature or more to be reached, as well as this can lead to ease to burn out and remove PMs (particulate matters) collected in the first cells 15 to regenerate a honeycomb structure filter. As the magnetic material having a curry point of 700° C. or more, an alloy containing Fe or Co as a main component is suitable, and specific compositions include, for example, the balance Co-20% by mass of Fe; the balance Co-25% by mass of Ni-4% by mass of Fe; the balance Fe-15-35% by mass of Co; the balance Fe-17% by mass of Co-2% by mass of Cr-1% by mass of Mo; the balance Fe-49% by mass of Co-2% by mass of V; the balance Fe-18% by mass of Co-10% by mass of Cr-2% by mass of Mo-1% by mass of Al; the balance Fe-27% by mass of Co-1% by mass of Nb; the balance Fe-20% by mass of Co-1% by mass of Cr-2% by mass of V; the balance Fe-35% by mass of Co-1% by mass of Cr; pure cobalt; pure iron; electromagnetic soft iron; the balance Fe-0.1-0.5% by mass of Mn; and the like. Here, the Curie point of the magnetic substance refers to a temperature at which a ferromagnetic property is lost.

Although materials of the partition walls 12 and the outer peripheral wall 11 of the honeycomb structure 1 are not particularly limited, the honeycomb structure is required to be a porous body having a large number of pores. Therefore, the honeycomb structure 1 is typically formed of a ceramic material. Examples of the ceramic material include a sintered body comprised of cordierite, silicon carbide, aluminum titanate, silicon nitride, mullite, alumina, a silicon-silicon carbide-based composite material, or silicon carbide-cordierite based composite material, in particular, a sintered body mainly based on a silicon-silicon carbide composite material or silicon carbide. As used herein, the expression "silicon carbide-based" means that the honeycomb structure 1 contains silicon carbide in an amount of 50% by mass or more of the entire honeycomb structure 1. The phrase "the honeycomb structure 1 is mainly based on a silicon-silicon carbide composite material" means that the honeycomb structure 1 contains 90% by mass or more of the silicon-silicon carbide composite material (total mass) based on the entire honeycomb structure 1. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the honeycomb structure 1 is mainly based on silicon carbide" means that the honeycomb structure 1 contains 90% by mass or more of silicon carbide (total mass) based on the entire honeycomb structure 1.

Preferably, the ceramic material is at least one of cordierite, silicon carbide, aluminum titanate, silicon nitride, mullite, or alumina.

The cell shape of the honeycomb structure 1 may be, but not particularly limited to, a polygonal shape such as a triangle, a quadrangle, a pentagon, a hexagon and an octagon; a circular shape; or an ellipse shape, in a cross section orthogonal to the central axis, or other non-defined shapes.

Further, an outer shape of the honeycomb structure 1 may be, but not particularly limited to, a shape such as a pillar shape with circular end faces (cylindrical shape), a pillar shape with oval end faces, and a pillar shape with polygonal (square, pentagonal, hexagonal, heptagonal, octagonal, and the like) end faces, and the like. Furthermore, the size of the honeycomb structure 1 is not particularly limited, and an axial length of the honeycomb structure is preferably from 40 to 500 mm. Further, for example, when the outer shape of the honeycomb structure 1 is cylindrical, a radius of each end face is preferably from 50 to 500 mm.

The partition walls 12 of the honeycomb structure 1 preferably have a thickness of from 0.20 to 0.50 mm, and more preferably from 0.25 to 0.45 mm, in terms of ease of production. For example, the thickness of 0.20 mm or more improves the strength of the honeycomb structure 1. The thickness of 0.50 mm or less can result in lower pressure loss when the honeycomb structure 1 is used as a filter. It should be noted that the thickness of the partition walls 12 is an average value measured by a method for observing the axial cross section with a microscope.

Further, the partition walls 12 forming the honeycomb structure 1 preferably have a porosity of from 30 to 70%, and more preferably from 40 to 65%, in terms of ease of production. The porosity of 30% or more tends to decrease a pressure loss. The porosity of 70% or less can maintain the strength of the honeycomb structure 1.

The porous partition walls 12 preferably have an average pore size of from 5 to 30 μm, and more preferably from 10 to 25 μm. The average pore size of 5 μm or more can decrease the pressure loss when the honeycomb structure 1 is used as a filter. The average pore size of 30 μm or less can maintain the strength of the honeycomb structure 1. As used herein, the terms "average pore diameter" and "porosity" mean an average pore diameter and a porosity measured by mercury porosimetry, respectively.

The honeycomb structure 1 preferably has a cell density in a range of from 5 to 63 cells/cm², and more preferably in a range of from 31 to 54 cells/cm², although not particularly limited thereto.

Such a honeycomb structure 1 is produced by forming a green body containing a ceramic raw material into a honeycomb shape having partition walls 12 that penetrate from one end face to other end face and define a plurality of cells 15 to form flow paths for a fluid, to form a honeycomb formed body, and drying the honeycomb formed body and then firing it. When such a honeycomb structure is used as the honeycomb structure 1 according to the present embodiment, the outer peripheral wall may be integrally extruded with a honeycomb structure portion, which is used as the outer peripheral wall as it is, or an outer circumference of the honeycomb formed body (honeycomb structure) may be ground and shaped into a predetermined shape after forming or firing it, and a coating material may be applied to the outer circumference-ground honeycomb structure to form an outer peripheral coating. In the honeycomb structure 1 of this embodiment, for example, a honeycomb structure having an outer circumference without grinding the outermost circumference of the honeycomb structure may be used, and the coating material may be further applied onto the outer peripheral surface of the honeycomb structure having the outer circumference (that is, a further outer side of the outer circumference of the honeycomb structure) to form the outer coating. That is, in the former case, only the outer peripheral coating made of the coating material forms the outer peripheral surface 11 positioned on the outermost circumference. On the other hand, in the latter case, an outer peripheral wall 11 having a two-layered structure positioned on the outermost periphery is formed in which the outer peripheral coating made of the coating material is further laminated on the outer peripheral surface of the honeycomb structure. The outer peripheral wall may be extruded integrally with the honeycomb structure portion and fired as it is, which may be used as the outer peripheral wall without processing the outer circumference.

A composition of the coating material is not particularly limited, and various known coating materials can be appropriately used. The coating material may further contain colloidal silica, an organic binder, clay and the like. The organic binder is preferably used in an amount of from 0.05 to 0.5% by mass, and more preferably from 0.1 to 0.2% by mass. Further, the clay is preferably used in an amount of from 0.2 to 2.0% by mass, and more preferably from 0.4 to 0.8% by mass.

The honeycomb structure 1 is not limited to an integral type honeycomb structure 1 in which the partition walls 12 are integrally formed. For example, the honeycomb structure 1 may be a honeycomb structure 1 in which pillar shaped honeycomb segments each having a plurality of cells 15 defined by porous partition walls 12 to form flow paths for a fluid are combined via joining material layers (which, hereinafter, may be referred to as a "joined honeycomb structure").

The honeycomb structure 1 according to the present embodiment may have a catalyst supported on the surfaces of the porous partition walls 12 that form inner walls of the cells 15 and/or in pores of the partition walls 12. Thus, the honeycomb structure 1 according to the present embodiment may be structured as a catalyst support having a supported catalyst, and as a filter (for example, a diesel particulate filter (hereinafter also referred to as "DPF") including the plugged portions 18, 19 for purifying particulate matters (carbon fine particles) in an exhaust gas.

A type of the catalyst is not particularly limited, and it can be appropriately selected according to the use purposes and applications of the honeycomb structure 1. Examples of the catalyst include noble metal catalysts or other catalysts. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (ANT catalyst) containing an alkaline earth metal and platinum as storage components for nitrogen oxides ($NO_x$). Illustrative examples of a catalyst that does not use the noble metal include a $NO_x$ selective catalytic reduction catalyst (SCR catalyst) containing a copper-substituted or iron-substituted zeolite, and the like. Also, two or more catalysts selected from the group consisting of those catalysts may be used. A method for supporting the catalyst is not particularly limited, and it can be carried out according to a conventional method for supporting the catalyst on the honeycomb structure.

Using each of fired honeycomb structures as a honeycomb segment, the side faces of the plurality of honeycomb segments can be joined with a joining material so as to be integrated to provide a honeycomb structure in which the honeycomb segments are joined. For example, the honeycomb structure in which the honeycomb segments are joined can be produced as follows. The joining material is applied to joining surfaces (side surfaces) of each honeycomb segment while attaching joining material adhesion preventing masks to both end faces of each honeycomb segment.

These honeycomb segments are then arranged adjacent to each other such that the side surfaces of the honeycomb segments are opposed to each other, and the adjacent honeycomb segments are pressure-bonded together, and then heated and dried. Thus, the honeycomb structure in which the side surfaces of the adjacent honeycomb segments are joined with the joining material is produced. For the honeycomb structure, the outer peripheral portion may be ground into a desired shape (for example, a pillar shape), and the coating material may be applied to the outer peripheral surface, and then heated and dried to form an outer peripheral wall 11.

The material of the joining material adhesion preventing mask that can be suitably used includes, but not particularly limited to, synthetic resins such as polypropylene (PP), polyethylene terephthalate (PET), polyimide, Teflon (registered trademark) and the like. Further, the mask is preferably provided with an adhesive layer, and the material of the adhesive layer is preferably an acrylic resin, a rubber (for example, a rubber mainly based on a natural rubber or a synthetic rubber), or a silicon resin.

Examples of the joining material adhesion preventing mask that can be suitable used include an adhesive film having a thickness of from 20 to 50 μm.

The joining material that can be used may be prepared by, for example, mixing ceramic powder, a dispersion medium (for example, water or the like), and optionally additives such as a binder, a deflocculant and a foaming resin. The ceramics may be preferably ceramics containing at least one of cordierite, mullite, zircon, aluminum titanate, silicon carbide, silicon nitride, zirconia, spinel, indialite, sapphirine, corundum, or titania, and more preferably having the same material as that of the honeycomb structure. The binder includes polyvinyl alcohol, methyl cellulose, CMC (carboxymethyl cellulose) and the like.

The honeycomb structure 1 may have surface layers on at least a part of the surfaces of the partition walls 112. Each surface layer 114 contains a magnetic substance and has permeability.

As used herein, "permeability" means that a permeability of each surface layer is $1.0 \times 10^{-13}$ m$^2$ or more. From the viewpoint of further reducing the pressure loss, the permeability is preferably $1.0 \times 10^{-12}$ m$^2$ or more. Since each surface layer has the permeability, the pressure loss caused by the surface layers can be suppressed.

Further, as used herein, the "permeability" refers to a physical property value calculated by the following equation (1), which value is an index indicating passing resistance when a certain gas passes through an object (partition walls). Here, in the following equation (1), C represents a permeability (m$^2$), F represents a gas flow rate (cm$^3$/s), T represents a thickness of a sample (cm), V represents a gas viscosity (dynes·sec/cm$^2$), D represents a diameter of a sample (cm), P represents a gas pressure (PSI). The numerical values in the following equation (1) are: 13.839 (PSI)=1 (atm) and 68947.6 (dynes·sec/cm$^2$)=1 (PSI).

[Equation 1]

$$C = \frac{8FTV}{\pi D^2 (P^3 - 13.839^2)/13.839 \times 68947.6} \times 10^{-4} \quad (1)$$

When measuring the permeability, the partition walls 12 with the surface layers are cut out, the permeability is measured on the partition walls 12 with the surface layers, and the permeability is then measured on the partition walls 12 from which the surface layers have been removed. From a ratio of thicknesses of the surface layer and the partition wall and the permeability measurement results, the permeability of the surface layers is calculated.

Since the surface layers contain the magnetic substance, the heat propagated by the induction heating of the plugged portions 19 containing the magnetic substance heats the surface layers, so that the honeycomb structure 1 is further satisfactorily heated by electromagnetic induction. For the magnetic substance contained in the surface layers, the same material as that of the magnetic substance contained in the plugged portions 19 can be used.

The surface layers preferably have a porosity of 50% or more, and more preferably 60% or more, and still more preferably 70% or more. By having the porosity of 50% or more, the pressure loss can be suppressed. However, if the porosity is too high, the surface layers become brittle and easily peels off. Therefore, the porosity is preferably 90% or less.

As a method of measuring the porosity of the surface layers by the mercury press-in method, a difference between a mercury porosity curve of the substrate on which the surface layers are formed and a mercury porosity curve of only the substrate from which the surface layers have been scrapped off and removed is determined to be a mercury porosity curve of the surface layers, and the porosity of the surface layers is calculated from the mass of the scraped surface layers and the mercury porosity curve. A SEM image may be taken, and the porosity of the surface layers may be calculated from an area ratio of the void portions and the solid portions by image analysis of the surface layer portions.

The surface layers preferably have an average pore diameter of 10 μm or less, and more preferably 5 μm or less, and further preferably 4 μm or less, and particularly preferably 3 μm or less. The average pore diameter of 10 μm or less can achieve a higher particle collection efficiency. However, if the average pore diameter of the surface layers is too low, the pressure loss will increase. Therefore, the average pore diameter is preferably 0.5 μm or more.

As a method of measuring the average pore diameter of the surface layers by the mercury press-in method, in the form of peak values in the mercury porosimeter, a difference between a mercury porosity curve (pore volume frequency) on the substrate on which the surface layers are formed and a mercury porosity curve on only the substrate from which only the surface layers 114 have been scrapped off and removed is determined to be a mercury porosity curve of the surface layers, and its peak is determined to be the average pore diameter. Further, an SEM image of the cross section of the honeycomb structure 1 may be taken, and the surface layer portion may be subject to image analysis to binarize the void portions and the solid portions, and twenty or more voids may be randomly selected to average the inscribed circles, and the average may be determined to be the average pore diameter.

When magnetic particles are used as the magnetic substance in the surface layers, the magnetic particles preferably have a weight average particle diameter of 20 μm or less. The weight average particle diameter of 20 μm or less can allow the average pore diameter, thickness, and porosity of the target surface layers to be within satisfactory ranges, in combination with other controllable design factors. Although any lower limit of the weight average particle diameter of the magnetic particles is not particularly set, it can be, for example, 0.5 μm or more. It is to understand that the weight average particle diameter is measured by a laser diffraction type particle size distribution measuring device.

Further, the magnetic particles preferably have a shortest diameter d of from 0.1 to 5 μm, and more preferably L/d≥3 in which L (μm) is the longest diameter of the magnetic particles. This can allow a microstructure of each surface layer ensuring sufficient permeability while maintaining electrical conductivity to be ensured. The shortest diameter d is obtained by performing image analysis of the SEM captured images for 50 particles and determining maximum line segments among line segments orthogonal to the longest diameters to be the shortest diameters of the particles, which are averaged by the number of particles. The longest diameter L is obtained by averaging the longest diameters of 50 or more particles by the number of particles in the SEM image. Preferably, the magnetic particles are needle-shaped. The needle-shaped refers to a ratio L/d≥5.

Further, the thickness of each surface layer is not particularly limited. However, in order to obtain the effect of the surface layers more remarkably, the thickness of each surface layer is preferably 10 μm or more. On the other hand, from the viewpoint of avoiding an increase in pressure loss, the thickness of each surface layer is preferably 80 μm or less. The thickness of each surface layer is more preferably 50 μm or less. For a method of measuring the thickness of each surface layer, for example, the honeycomb structure 1 on which the surface layers are formed is cut in a direction perpendicular to the cell extending direction, and the thickness of each surface layer is measured from the cross section of the honeycomb structure 1, and the measured thicknesses at arbitrary five points can be averaged.

Figure 3:
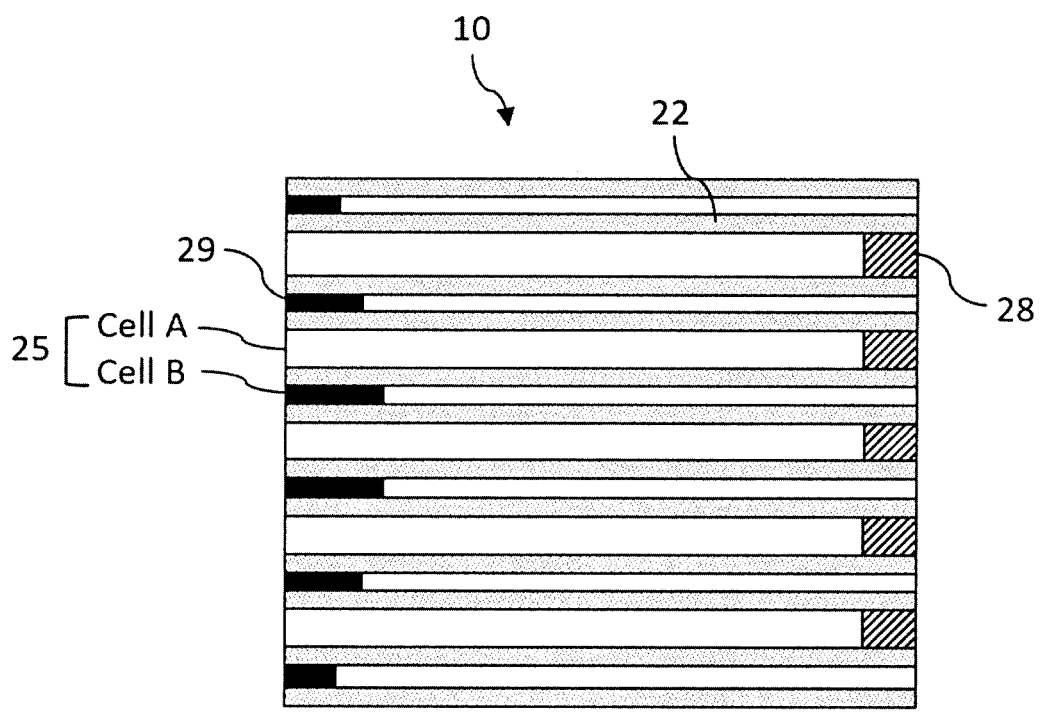
FIG. 3 is a cross-sectional view schematically illustrating a cross section of a honeycomb structure according to an embodiment of the present invention for cells having plugged portions and partition walls, which cross section is parallel to a cell extending direction (a gas flow direction)

FIG. 3 shows a cross-sectional view schematically illustrating a cross section of a honeycomb structure 10 according to another embodiment of the present invention for cells 25 having plugged portions 28, 29 and partition walls 22, which cross section is parallel to the cell extending direction (the gas flow direction). In the illustrated honeycomb structure 1, the plugged portions 29 of the cells B which are opened on the outflow side of the fluid are made of a material containing a magnetic substance. Therefore, plugged portions will continuingly contain the magnetic substance when the honeycomb structure 10 is used as a honeycomb filter, which eliminates necessity to use the cells 25 of the honeycomb structure 10 only for filling the material containing the magnetic substance. As a result, the increase in pressure loss can be suppressed. Further, in the illustrated honeycomb structure 10, each opening of the cells B which are opened on the outflow side of the fluid and have the plugged portions 29 on the end face on the inflow side of the fluid is smaller than each opening of the cells A which are opened on the inflow side of the fluid and have the plugged portions 28 on the end face of the outflow side of the fluid, and the plugged portions 29 of the cells B contain the magnetic substance. According to such a configuration, in an exhaust gas purifying device using the honeycomb structure 10, an increased amount of the fluid can be incorporated from the cells A which have the larger openings on the inflow side of the fluid and the cells B have the plugged portions 29 containing the magnetic substance on the inflow side of the fluid, so that only arranging of a coil wiring that spirally surrounds the outer circumference of the honeycomb structure 10 near positions corresponding to the plugged portions 29 of the cells B, i.e., only arranging of the coil wiring near the end face on the inflow side of the fluid so as to surround the outer circumference of the honeycomb structure 10 to cause induction heating can allow heat from the end face heated on the inflow side to be propagated in the partition walls 22 and the cells 25 as the fluid moves, and can cause the honeycomb structure 10 to be heated to the outflow side. Therefore, this eliminates necessity to heat the entire honeycomb structure 10 in the length direction, so that the energy efficiency can be improved. Further, since only local heating is required without heating the entire honeycomb structure 10 in the length direction, an input power until combustion of PMs (particulate matters) can be reduced. Further, the PMs (particulate matters), which tend to be unevenly distributed near the end face in the cell 25, can be rapidly burned out and removed to easily regenerate the honeycomb structure filter. In the honeycomb structure 10 as shown in FIG. 3, the openings of the cells B are smaller than those of the cells A, although not limited thereto. The openings of the cells A and the openings of the cells B are formed to have different sizes, and the plugged portions 28 of the cells A or the plugged portions 29 of the cells B which have the smaller openings may be made of the material containing the magnetic substance.

Figure 4:
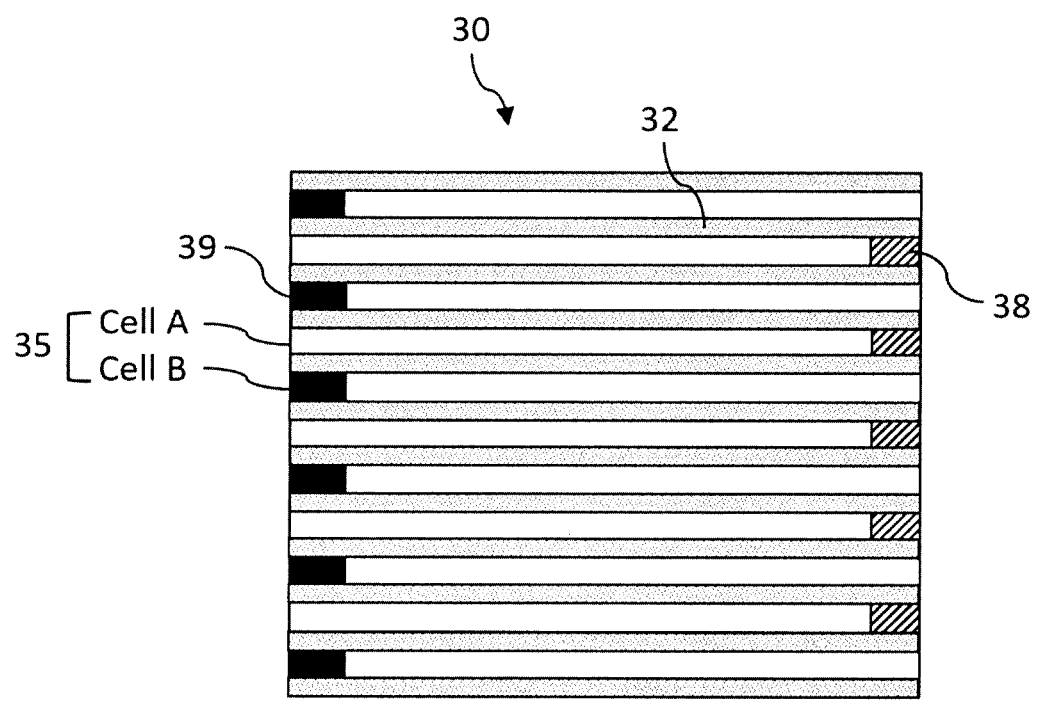
FIG. 4 is a cross-sectional view schematically illustrating a cross section of a honeycomb structure according to an embodiment of the present invention for cells having plugged portions and partition walls, which cross section is parallel to a cell extending direction (a gas flow direction)

FIG. 4 shows a cross section of a honeycomb structure 30 according to another embodiment of the present invention for cells 35 and partition walls 32 having plugged portions 38, 39, which cross section is parallel to the cell extending direction (the gas flow direction). In the illustrated honeycomb structure 30, the openings of the cells B which are opened on the outflow side of the fluid and have the plugged portions 39 on the end face on the inflow side of the fluid are formed to have substantially the same size as the openings of the cells A which are opened on the inflow side of the fluid and have the plugged portions 38 on the end face on the outflow side of the fluid, and the plugged portions 39 of the cells B are made of a material containing a magnetic substance. The honeycomb structure 30 is formed such that depths of the plugged portions 39 of the cells B in the cell extending direction are substantially the same from the center to the outer circumference of the honeycomb structure 30. By forming the plugged portions 39 of the cells B from the material containing the magnetic substance, plugged portions will continuingly contain the magnetic substance when the honeycomb structure 30 is used as a honeycomb filter, which eliminates necessity to use the cells 35 of the honeycomb structure 30 only for filling the material containing the magnetic substance. As a result, the increase in pressure loss can be suppressed. Further, in the illustrated honeycomb structure 30, the cells B have the plugged portions 39 containing the magnetic substance on the end face on the inflow side of the fluid. Therefore, when the honeycomb structure 30 is used as the exhaust gas purifying device, the arrangement can be the same as that described in the exhaust gas purifying device 6 using the honeycomb structure 1 as described above.

(2. Exhaust Gas Purifying Device)

Figure 5:
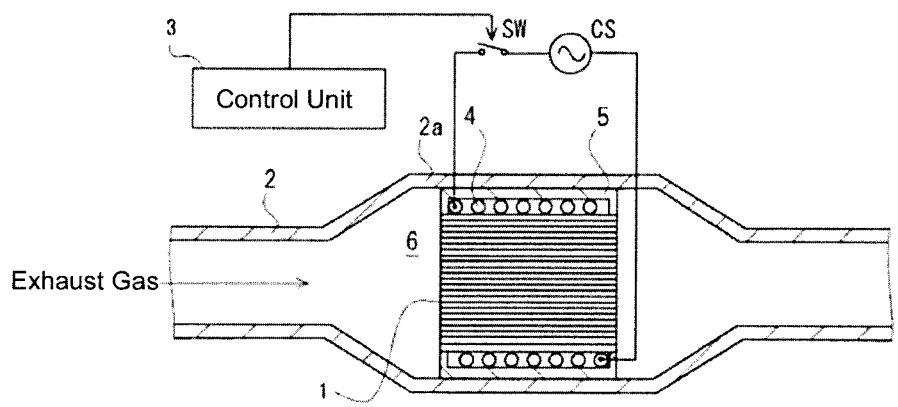
FIG. 5 is a schematic view of an exhaust gas flow path of an exhaust gas purifying device including a honeycomb structure according to an embodiment of the present invention.

FIG. 5 shows a schematic view of an exhaust gas flow path of an exhaust gas purifying device 6 including the honeycomb structure 1. The exhaust gas flow path of the exhaust gas purifying device 6 having the honeycomb structure 1 and a coil wiring 4 that spirally surrounds the outer circumference of the honeycomb structure 1 may be defined by a metal pipe 2. The exhaust gas purifying device 6 can be arranged in an increased diameter portion 2a of the metal pipe 2. The coil wiring 4 may be fixed to the interior of the metal pipe 2 by a fixing member 5. The fixing member 5 is preferably a heat-resistant member such as ceramic fibers. The honeycomb structure 1 may support a catalyst.

The coil wiring 4 is spirally wound around the outer circumference of the honeycomb structure 1. It is also assumed that two or more coil wirings 4 are used. An AC current supplied from an AC power supply CS flows through the coil wiring 4 in response to turning on (ON) of a switch SW, and as a result, a magnetic field that periodically changes is generated around the coil wiring 4. The on/off of the switch SW is controlled by a control unit 3. The control unit 3 can turn on the switch SW in synchronization with the start of an engine and pass an alternating current through the coil wiring 4. It is also assumed that the control unit 3 turns on the switch SW regardless of the start of the engine (for example, in response to an operation of a heating switch pushed by a driver).

In the present disclosure, a temperature of the honeycomb structure 1 is increased in response to the change of the magnetic field according to the alternating current flowing through the coil wiring 4. Based on this, carbon fine particles and the like collected by the honeycomb structure 1 are burned out. Also, when the honeycomb structure 1 supports the catalyst, the increase in the temperature of the honeycomb structure 1 raises a temperature of the catalyst supported by the catalyst support contained in the honeycomb structure 1 and promotes the catalytic reaction. Briefly, carbon monoxide (CO), nitrogen oxide ($NO_x$), and hydrocarbon (CH) are oxidized or reduced to carbon dioxide ($CO_2$), nitrogen ($N_2$), and water ($H_2O$).

Figure 6:
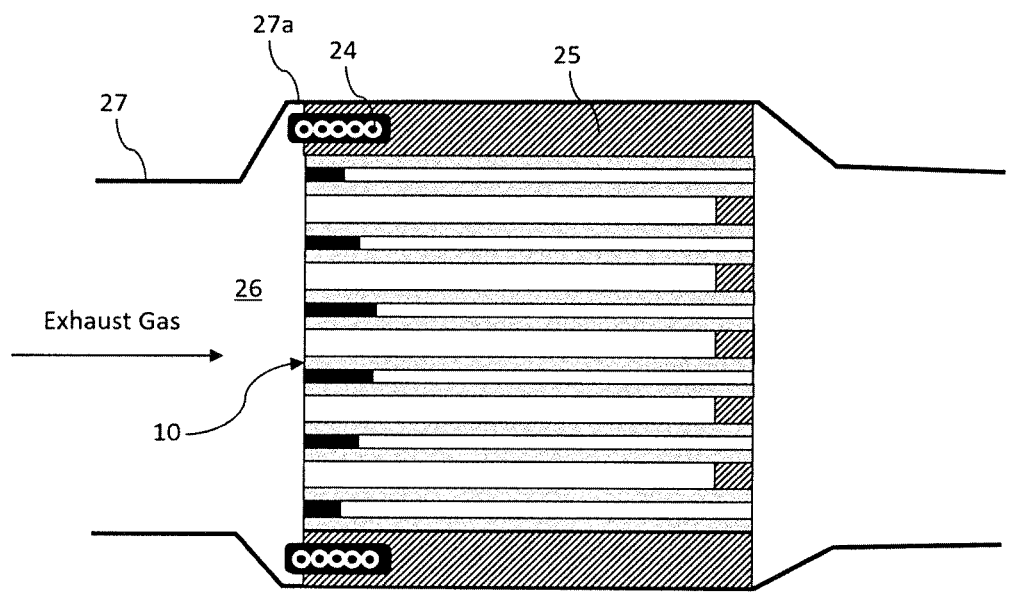
FIG. 6 is an enlarged schematic view of an exhaust gas flow path of an exhaust gas purifying device including a honeycomb structure according to an embodiment of the present invention.

FIG. 6 is an enlarged schematic view of an exhaust gas flow path of an exhaust gas purifying device 26 including the honeycomb structure 10. In the exhaust gas purifying device 26, the exhaust gas flow path includes: the honeycomb structure 10; and a coil wiring 24 that spirally surrounds the outer circumference of the honeycomb structure 10. The flow path of the exhaust gas is defined by a metal pipe 27, and the exhaust gas purifying device 26 can be arranged in an increased diameter portion 27a of the metal pipe 27. The coil wiring 24 is fixed to the interior of the metal pipe 27 by a fixing member 25 made of a heat-resistant member such as ceramic fibers. In the exhaust gas flow path of the exhaust gas purifying device 26 including the honeycomb structure 10, the cells B have the plugged portions 29 containing the magnetic substance on the inflow side of the fluid, and the coil wiring 24 that spirally surrounds the outer circumference of the honeycomb structure 10 is arranged at the positions corresponding to the plugged portions 29 of the cells B. That is, the coil wiring 24 is arranged so as to spirally surround the outer circumference only near the end face of the honeycomb structure 10 on the inflow side to cause induction heating. The heat from the end face heated on the inflow side is propagated in the partition walls 22 and the cells 25 as the fluid moves, and the honeycomb structure 10 is heated to the outflow side. This eliminates necessity to heat the entire honeycomb structure 10 in the length direction, resulting in good energy efficiency.

(3. Method for Producing Honeycomb Structure)

The method for producing the honeycomb structure will be described below.

First, the honeycomb structure having the porous partition walls and the plurality of cells defined by the partition walls is produced. For example, when producing the honeycomb structure made of cordierite, a cordierite-forming raw material is firstly prepared as a material for a green body. The cordierite-forming raw material contains a silica source component, a magnesia source component, and an alumina source component, and the like, in order to formulate each component so as to have a theoretical composition of cordierite. Among them, the silica source component that can be used includes preferably quartz and fused silica, and the particle diameter of the silica source component is preferably from 100 to 150 μm.

Examples of the magnesia source component include talc and magnesite. Among them, talc is preferred. The talc is preferably contained in an amount of from 37 to 43% by mass in the cordierite-forming raw material. The talc preferably has a particle diameter (average particle diameter) of from 5 to 50 μm, and more preferably from 10 to 40 μm. Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

A material for a green body to be added to the cordierite-forming raw material (additive) is then prepared. At least a binder and a pore former are used as additives. In addition to the binder and the pore former, a dispersant or a surfactant can be used.

The pore former that can be used includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used include at least one metal of iron, copper, zinc, lead, aluminum, and nickel, alloys mainly based on those metals (e.g., carbon steel or cast iron, stainless steel, for iron), or alloys mainly based on two or more of those metals. Among them, the low melting point reactant is preferably an iron alloy in the form of powder or fiber. Further, the low melting point reactant preferably has a particle diameter or a fiber diameter (an average diameter) of from 10 to 200 μm. Examples of a shape of the low melting point reactant include a spherical shape, a wound-lozenge shape, a konpeito shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried.

Subsequently, a raw material for the plugged portions is prepared. The material for the plugged portions (plugging slurry) may use the same material for a green body as that of the partition walls (honeycomb dried body), or may use a different material. Specifically, the raw material for the plugged portions can be obtained by mixing a ceramic raw material, a surfactant, and water, and optionally adding a sintering aid, a pore former and the like to form a slurry, which is kneaded using a mixer or the like.

Subsequently, masks are applied onto some of cell opening portions on one end face of the honeycomb dried body, and the end face is immersed in a storage container in which the plugging slurry is stored to fill the non-masked cells with the plugging slurry. Similarly, masks are applied onto some of cell opening portions on the other end face of the honeycomb dried body, and the end face is immersed in a storage container in which the plugging slurry is stored to fill the non-masked cells with the plugging slurry. It is then dried and fired to obtain a honeycomb structure having plugged portions. As the drying conditions, the same conditions as those for drying the honeycomb formed body can be used. Further, the conditions for the above firing can be typically in an air atmosphere at a temperature of 1410 to 1440° C. for 3 to 15 hours, when the cordierite-forming raw material is used.

Here, the magnetic substance is contained in the plugging slurry for immersing the cell openings on one or both of the end faces. As a result, one or both of the plugged portions of the cells A and the plugged portions of the cells B of the honeycomb structure will contain the magnetic substance.

A method of plugging is simply carried out by pushing a paste-like material into the cells with a spatula such as a squeegee. It is easy to control the depth by the number of squeegee processes pushed. The number of pushing processes is increased for the portions of the cells desired to insert the magnetic material deeply, and the number of pushing processes is decreased for shallow portions around the former cells.

Further, when the resulting honeycomb structure is produced in a state where the outer peripheral wall is formed on the outer peripheral surface of the honeycomb structure, the outer peripheral surface may be ground to remove the outer peripheral wall. The coating material is applied to the outer circumference of the honeycomb structure from which the outer peripheral wall has thus been removed, in a subsequent step, to form an outer peripheral coating. Further, when grinding the outer peripheral surface, a part of the outer peripheral wall may be ground and removed, and on that part, the outer peripheral coating may be formed by the coating material.

When preparing the coating material, it can be prepared using, for example, a biaxial rotary type vertical mixer.

Further, the coating material may further contain colloidal silica, an organic binder, clay and the like. The content of the organic binder is preferably from 0.05 to 0.5% by mass, and more preferably from 0.1 to 0.2% by mass. The content of the clay is preferably from 0.2 to 2.0% by mass, and more preferably from 0.4 to 0.8% by mass.

The coating material is applied onto the outer peripheral surface of the honeycomb structure previously produced, and the applied coating material is dried to form an outer peripheral coating. Such a structure can allow for effective suppression of cracking in the outer peripheral coating during the drying and the heat treatment.

Examples of a method for coating the coating material can include a method for applying the coating material by placing the honeycomb structure on a rotating table and rotating it, and pressing a blade-shaped applying nozzle along the outer peripheral portion of the honeycomb structure while discharging the coating material from the applying nozzle. Such a configuration can allow the coating material to be applied with a uniform thickness. Further, this method can lead to a decreased surface roughness of the formed outer peripheral coating, and can result in an outer peripheral coating that has an improved appearance and is difficult to be broken by thermal shock.

When the outer peripheral surface of the honeycomb structure is ground and the outer peripheral wall is removed, the coating material is applied onto the entire outer peripheral surface of the honeycomb structure to form the outer peripheral coating. On the other hand, when the outer peripheral wall is present on the outer peripheral surface of the honeycomb structure or a part of the outer peripheral wall is removed, the coating material may be partially applied to form the outer peripheral coating, or the coating material may be, of course, applied onto the entire outer peripheral surface of the honeycomb structure to form the outer peripheral coating.

The method for drying the applied coating material (i.e., the undried outer peripheral coating) is not limited, but in terms of preventing dry-cracking, it can suitably use, for example, a method of drying 25% or more of a water content in the coating material by maintaining the coating material at room temperature for 24 hours or more, and then maintaining it in an electric furnace at 600° C. for 1 hour or more to remove moisture and organic matters.

Further, when the opening portions of the cells of the honeycomb structure are not plugged in advance, plugging may be performed in the opening portions of the cells after forming the outer peripheral coating.

Furthermore, the silicon carbide powder contained in the coating material develops color by irradiating the outer peripheral surface of the resulting honeycomb structure with laser. Therefore, product information or the like may be printed (marked) on the outer peripheral coating of the resulting honeycomb structure by irradiating it with laser light.

Preferred examples of laser light used for marking with laser include carbon dioxide gas ($CO_2$) laser, YAG laser and $YVO_4$ laser. Laser conditions for irradiation with the laser light can be appropriately selected according to the type of the laser to be used. For example, when the $CO_2$ laser is used, the marking is preferably carried out at an output of from 15 to 25 W and a scan speed of from 400 to 600 mm/s. Such a marking method allows the irradiated portion to develop color so as to present dark color such as black to green, resulting in very good contrast due to color development to the non-irradiated portion.

When supporting the catalyst on the honeycomb structure, the printed portion is not deteriorated even after printing with the laser, and the printed portion can be read well even after supporting the catalyst. The method for supporting the catalyst is not particularly limited and can be carried out according to the method for supporting the catalyst carried out in the conventional method for producing the honeycomb structure.

DESCRIPTION OF REFERENCE NUMERALS 1, 10, 30 honeycomb structure
2, 27 metal pipe
3 control unit
4, 24 coil wiring
5, 25 fixing member
6, 26 exhaust gas purifying device
11 outer peripheral wall
12, 22, 32 partition wall
13 inflow end face
14 outflow end face
15, 25, 35 cell (cell A+cell B)
18, 28, 38 plugged portion of cell A
19, 29, 39 plugged portion of cell B

The invention claimed is:
1. A pillar shaped honeycomb structure, comprising:
a porous partition wall that defines a plurality of cells, the cells forming flow paths for a fluid, the cells extending from an inflow end face to an outflow end face; and
an outer peripheral wall located at the outermost circumference;
wherein the cells comprise: a plurality of cells A wherein a side of the inflow end face is opened and the outflow end face has a plugged portion; and a plurality of cells B wherein a side of the outflow end face is opened and the inflow end face has a plugged portion, the cells B being arranged alternately with the cells A; and
wherein one or both of the plugged portion of the cells A and the plugged portions of the cells B comprise a magnetic substance and glass.
2. The honeycomb structure according to claim 1, wherein the magnetic substance in the plugged portion has a Curie point of 700° C. or more.

3. The honeycomb structure according to claim 2, wherein the magnetic substance in the plugged portion has a Curie point of 800° C. or more.

4. The honeycomb structure according to claim 1, wherein depths of one or both of the plugged portion of the cells A and the plugged portion of the cells B which comprise the magnetic substance in a cell extending direction are changed from a center toward an outermost circumference of the honeycomb structure.

5. The honeycomb structure according to claim 4, wherein the depths of one or both of the plugged portion of the cells A and the plugged portion of the cells B which comprise the magnetic substance in the cell extending direction gradually decrease from the center toward the outermost circumference of the honeycomb structure.

6. The honeycomb structure according to claim 1, wherein the honeycomb structure has a surface layer on at least a part of a surface of the partition wall, and wherein the surface layer comprises a magnetic substance and has permeability.

7. The honeycomb structure according to claim 1, wherein an opening of the cells A and an opening of the cells B is formed to have different sizes, and wherein the plugged portion of the cells A or the plugged portion of the cells B which has smaller opening are made of a material containing the magnetic substance.

8. The honeycomb structure according to claim 7, wherein the opening of the cells B is smaller than that of the cells A, and wherein the plugged portion of the cells B comprises the magnetic substance.

9. The honeycomb structure according to claim 1, wherein the partition wall and the outer peripheral wall comprise a ceramic material.

10. The honeycomb structure according to claim 9, wherein the ceramic material is at least one of cordierite, silicon carbide, aluminum titanate, silicon nitride, mullite, or alumina.

11. The honeycomb structure according to claim 1, wherein at least one catalyst of a three-way catalyst, an oxidation catalyst, an SCR catalyst, or an LNT catalyst is provided on surfaces of the porous partition walls forming inner walls of the cells and/or in pores of the partition walls.

12. An exhaust gas purifying device, comprising:
the honeycomb structure according to claim 1; and
a coil wiring that spirally surrounds an outer circumference of the honeycomb structure.

13. The exhaust gas purifying device according to claim 12, wherein the coil wiring is provided at positions corresponding to one or both of the plugged portion of the cells A and the plugged portion of the cells B.

* * * * *